United States Patent
Rush et al.

(10) Patent No.: US 6,945,133 B2
(45) Date of Patent: Sep. 20, 2005

(54) SPEED CONTROL SYSTEM FOR A POWER EQUIPMENT VEHICLE

(75) Inventors: Bob Rush, North Royalton, OH (US); Jeffery R. Kucera, Parma Heights, OH (US); Dennis Fowler, Brunswick, OH (US)

(73) Assignee: MTD Products Inc., Valley City, OH (US)

( * ) Notice: Subject to any disclaimer, the term of this patent is extended or adjusted under 35 U.S.C. 154(b) by 141 days.

(21) Appl. No.: 10/226,532

(22) Filed: Aug. 23, 2002

(65) Prior Publication Data

US 2003/0084655 A1 May 8, 2003

Related U.S. Application Data

(60) Provisional application No. 60/314,379, filed on Aug. 23, 2001.

(51) Int. Cl.$^7$ .......................... F16C 1/10; A01D 69/00; B62D 51/04
(52) U.S. Cl. .............................. 74/501.5 R; 74/502.2; 56/10.8; 180/19.3; 16/437
(58) Field of Search .................... 74/501.5 R, 502.2, 74/489; 56/11.6, 19.3, 11.3, 10.8, 194; 280/263; 180/19.3, 315; 16/437

(56) References Cited

U.S. PATENT DOCUMENTS

| | | | |
|---|---|---|---|
| 3,534,432 A | * 10/1970 | Davies et al. ................. 16/437 |
| 4,558,558 A | 12/1985 | Horner et al. |
| 4,835,949 A | 6/1989 | Seyerle |
| 5,146,735 A | * 9/1992 | McDonner .................... 56/11.3 |
| 5,155,985 A | * 10/1992 | Oshima et al. ............... 56/10.8 |
| 5,195,307 A | 3/1993 | Thorud et al. |
| 5,261,214 A | 11/1993 | Wollersheim |
| 5,343,678 A | * 9/1994 | Stuart ........................... 55/11.3 |
| 5,375,674 A | * 12/1994 | Peter .......................... 180/19.3 |
| 6,082,083 A | * 7/2000 | Stalpes et al. ............... 56/11.6 |

FOREIGN PATENT DOCUMENTS

| | | | | |
|---|---|---|---|---|
| DE | 26 48 349 | * | 2/1978 | .................. 56/194 |
| EP | 001285566 A1 | * | 2/2003 | .................. 56/194 |

OTHER PUBLICATIONS

Merriam Webster's Collegiate Dictionary, Tenth Edition, 1999, p. 1110.*

* cited by examiner

*Primary Examiner*—Vinh T. Luong
(74) *Attorney, Agent, or Firm*—Wegman, Hessler & Vanderburg

(57) ABSTRACT

A speed control system and method of assembling such a system for a power equipment vehicle such as a lawn mower. The speed control system comprises a speed control bail that pivots with respect to the vehicle handle bar, a pivot rod, and a cover. In order to increase the speed of the vehicle the operator pushes the speed control bail in the forward direction and in order to decrease the speed of the vehicle the operator pulls the bail in the backward direction. Assembly of the system on to the vehicle handle bar does not require the use of hand held or power tools thereby reducing manufacturing time and ultimately reducing production costs.

14 Claims, 12 Drawing Sheets

SPEED CONTROL SYSTEM FOR A POWER EQUIPMENT VEHICLE

This application claims priority to U.S. Ser. No. 60/314,379, entitled SPEED CONTROL SYSTEM FOR A WALK BEHIND MOWER, filed Aug. 23, 2001, which is incorporated herein by reference.

1. BACKGROUND OF THE INVENTION

A. Field of Invention

This invention pertains to the art of methods and apparatuses of a power equipment vehicle and more specifically to a speed control system that allows the operator to control the speed of the vehicle.

B. Description of the Related Art

It is known in the art to provide a self-propelled power equipment vehicle such as a walk behind lawn mower. More specifically it known in the art to provide a speed control system for a self-propelled vehicle to allow the operator the ability to control the speed of the vehicle.

U.S. Pat. No. 4,835,949 to Seyerle discloses a variable speed self-propelled lawn mower where the top portion of the handle is pivotally attached to the lower portion of the handle. In order to increase the speed of the mower the operator pushes the upper portion of the handle in the forward direction and to decrease the speed of the mower the operator pulls the upper portion of the handle in the backward direction.

U.S. Pat. No. 6,082,083 to Staples et al. also discloses a ground speed control system for an outdoor power equipment unit, such as a lawn mower. The control system includes a handle grip on the handle that slides up and down relative to a lower portion of the handle. As the operator slides the handle down the speed of the mower increases and as the operator slides the handle up the speed of the mower decreases.

Both aforementioned inventions achieve the objective of varying the speed of the mower. However, one distinct disadvantage of these inventions and others of similar design is the cost of manufacturing assembling these components. During the assembly process of these inventions it can be seen that hand tools and possibly power tools are required to complete the assembly. The additional time required to retrieve the tools and assemble the components for each mower increases the overall manufacturing cost of the mower.

The present invention provides methods and apparatuses for a new and improved speed control system, which is simple in design, effective in use, and overcomes the aforementioned disadvantage of increased manufacturing costs.

II. SUMMARY OF THE INVENTION

According to one aspect of the present invention, a new and improved speed control system is provided which has a handle, a speed control bail, a pivot rod, a cover and does not require hand held or power tools for assembly.

One advantage of this invention is the simple design of the speed control system that allows the manufacture the capability of assembling the components without the use of tools. This advantage permits the manufacture to reduce manufacturing time thereby reducing overall production costs of each vehicle.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
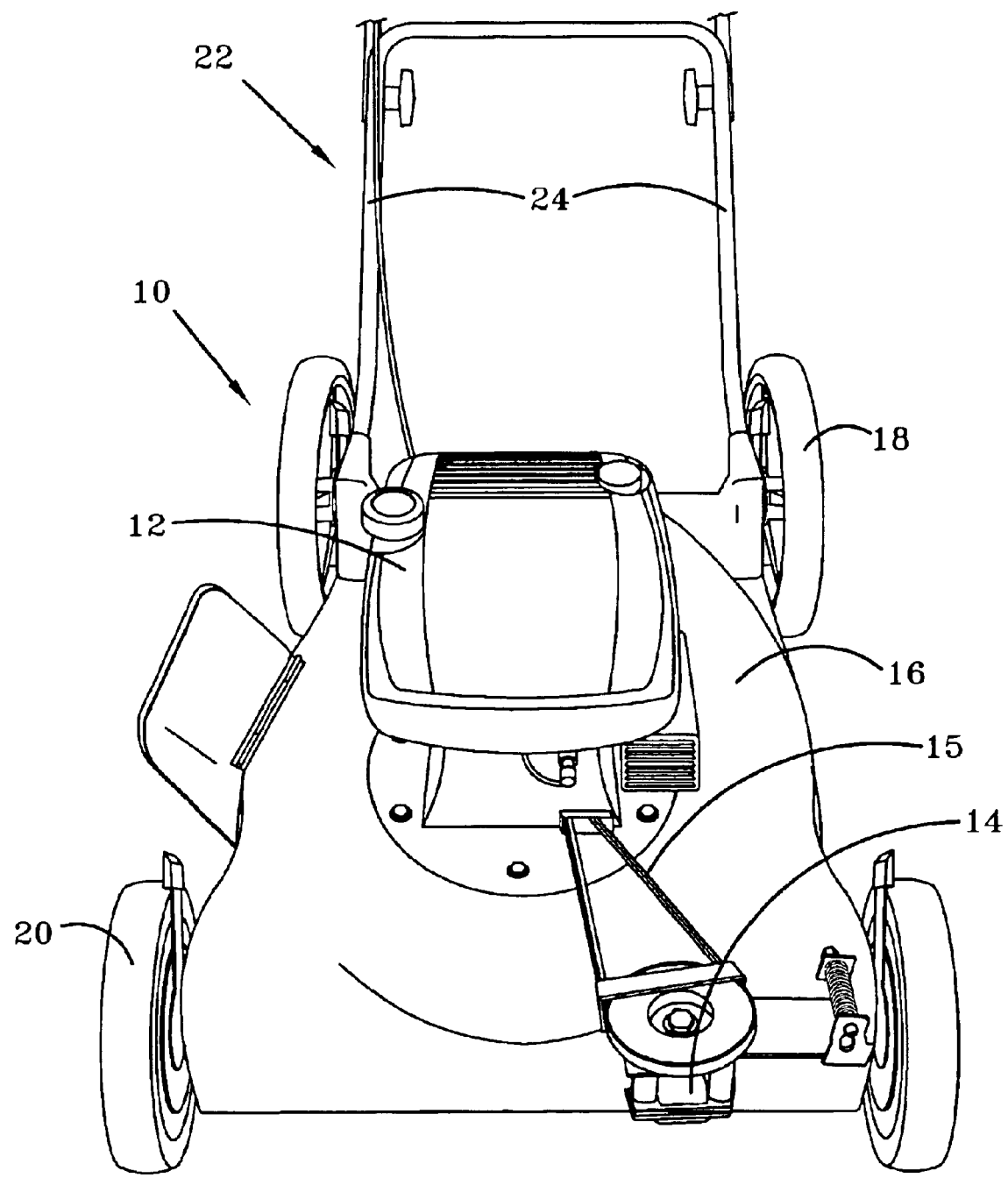
FIG. 1 is a top view of a lawn mower that would utilize the present invention.
Figure 7:
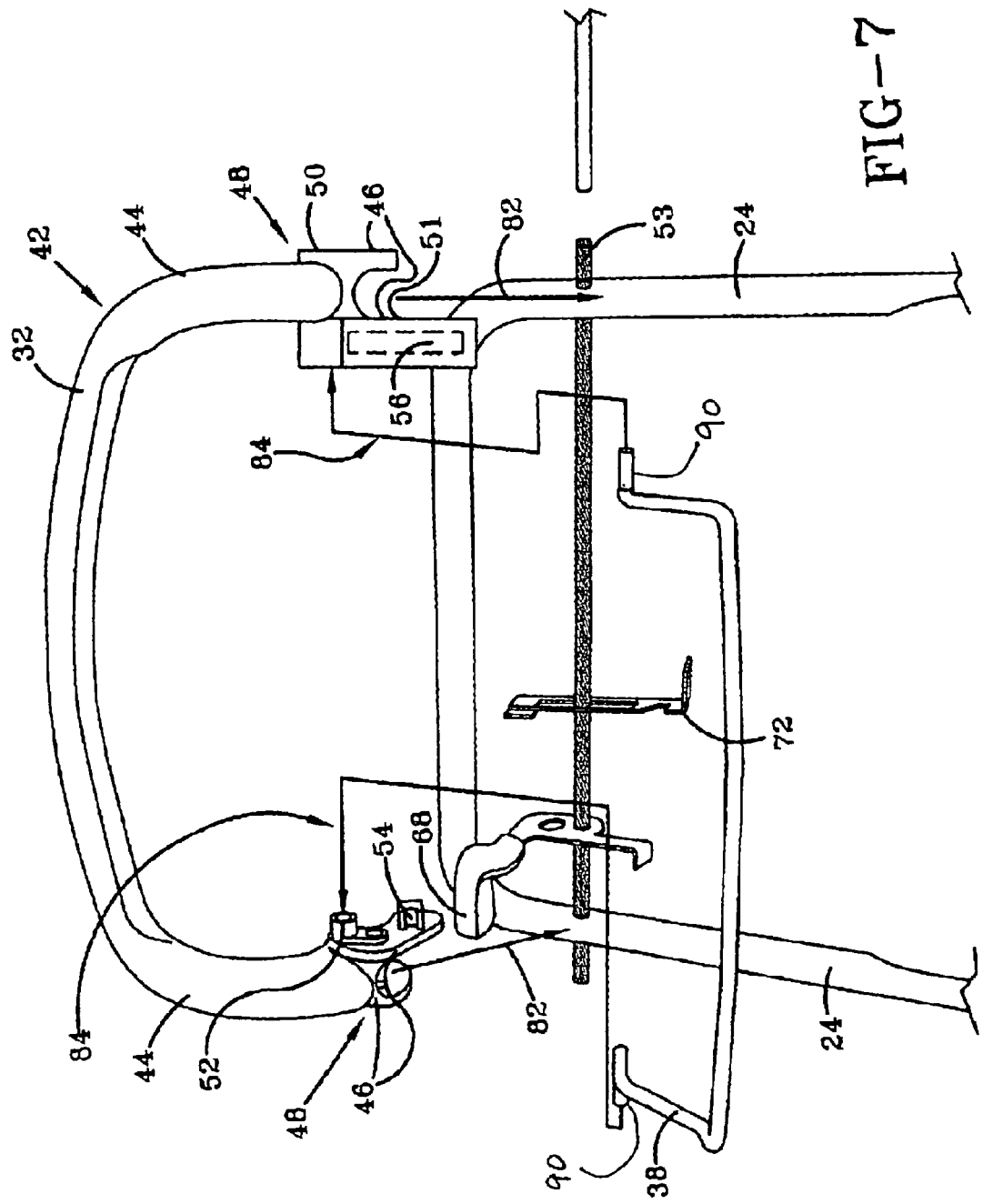
FIG. 7 is an exploded view of the present invention showing how the components are assembled.

Referring now to the drawings wherein the showings are for purposes of illustrating a preferred embodiment of the invention only and not for purposes of limiting the same, FIG. 1 shows a walk behind lawn mower (10) that incorporates the inventive speed control system (30). The lawn mower (10) has an engine (12), a transmission (14), a deck (16), back wheels (18), front wheels (20), a handle bar (22), and a cutting blade (not shown). The handle bar (22) has two support members (24) where each support member has an opening (26) located near the top (28) of the handle bar (22) as illustrated in FIG. 7. It should be noted that the present invention is not limited to use on a walk behind lawn mower (10). The present invention can be used on any type of power equipment vehicle used with sound engineering judgment such as a snow blower, yard vacuum, leaf blower, and the like. The operation of the lawn mower (10) is well known in the art and will not be described herein.

Figure 2:
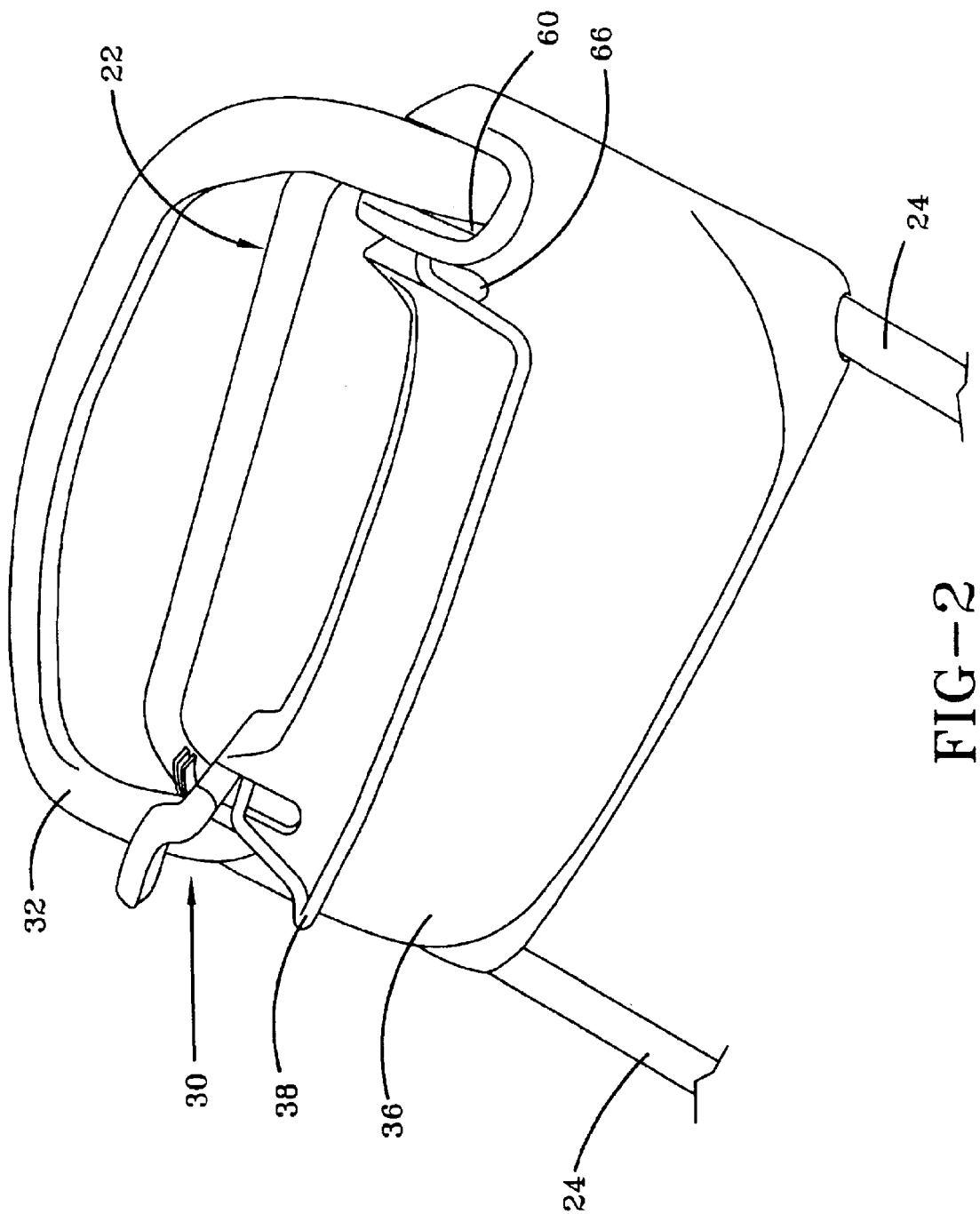
FIG. 2 is a perspective view of the present invention.
Figure 3:
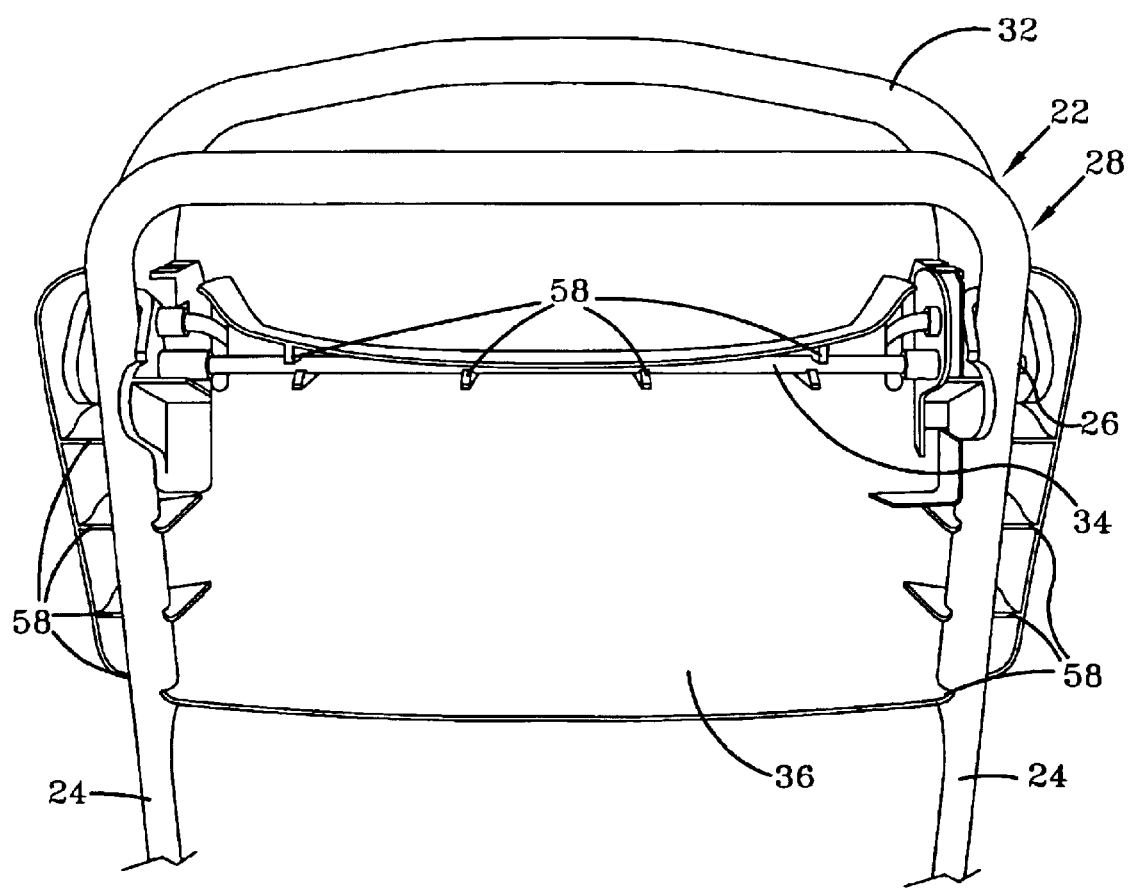
FIG. 3 is a back view of FIG. 2 that shows the positions of the connecting points or snap locations of the cover to the handle and rod.

FIGS. 2 and 3 show the present invention in the assembled state on the handle bar (22) of the lawn mower (10). In the preferred embodiment, the components of the present invention include a first pivoting member that is preferably a speed control bail (32), a rod member that is preferably a pivot rod (34), an attachment member that is preferably a cover (36), a second pivoting member that is preferably an operator presence control bail (38), and a self-starting mechanism (40). It should be noted that the operator presence control bail (38) and the self-starting mechanism (40) are optional components and are not required for the operation of the present invention.

FIG. 7 shows an exploded view of how the components of the speed control system (30) are assembled to the handle bar (22) of the mower (10). The speed control bail (32) is a U-shaped member (42) that has two support legs (44). Each support leg (44) has two-support members (46) that form a horseshoe shape (48) with the support leg (44). Each horseshoe shape (48) is designed to receive one support member (24) of the handle bar (22). Each support member (46) of the speed control bail (32) contains an aperture (50,51) designed to line up with the openings (26) on handle bar (22). The apertures (50, 51) are further designed to receive the pivot rod (34). The horseshoe shaped (48) ends can best be seen on FIG. 8. The speed control bail (32) further consists of a slot (52) designed to receive the operator presence control bail (38). The speed control bail (32) also consists of two cable stops (54, 56). The first cable stop (54) is used on an embodiment that utilizes the self-starting mechanism (40) and the second cable stop (56) is used on an embodiment that does not utilize the self-starting mechanism (40). Both cable stops (54, 56) are shown on FIG. 7. It should be noted that only one cable stop (72) is required for operation of the present invention and that both cable stops (54, 56) are shown only for the purpose of illustration.

Referring to FIGS. 2 through 5, show the cover (36) of the present invention. The cover (36) includes at least a first connection means that is preferably a snap (58). Most preferably each snap (38) includes two legs that form a groove into which the item to be attached to (or snapped to) are received. By "snapped" it is meant that the snaps (58) of the cover (36) are pressed against the item to be attached such that the item to be attached is received within the groove and held in place therein. In the preferred embodiment, a plurality of snaps (58) are used to snap the cover (36) onto the pivot rod (34) and to each of the support members (24) of the handle bar (22). The preferred snap (58) locations are best illustrated on FIG. 3. The cover (36) also preferably consists of two receiving zones (60) designed to wrap partially around and receive each end of the speed control bail (32). A tab (62) and tab slot (64) are located at the back of the receiving zones (60) so that the cover (36) can be securely fastened to the speed control bail (32). The cover (36) further consists of two additional bail slots (66) designed to receive the operator presence control bail (38) as illustrated in FIG. 2. The bail slots (66) in the cover (36) permit the operator presence control bail (38) to move in the forward and backward direction.

Figure 6:
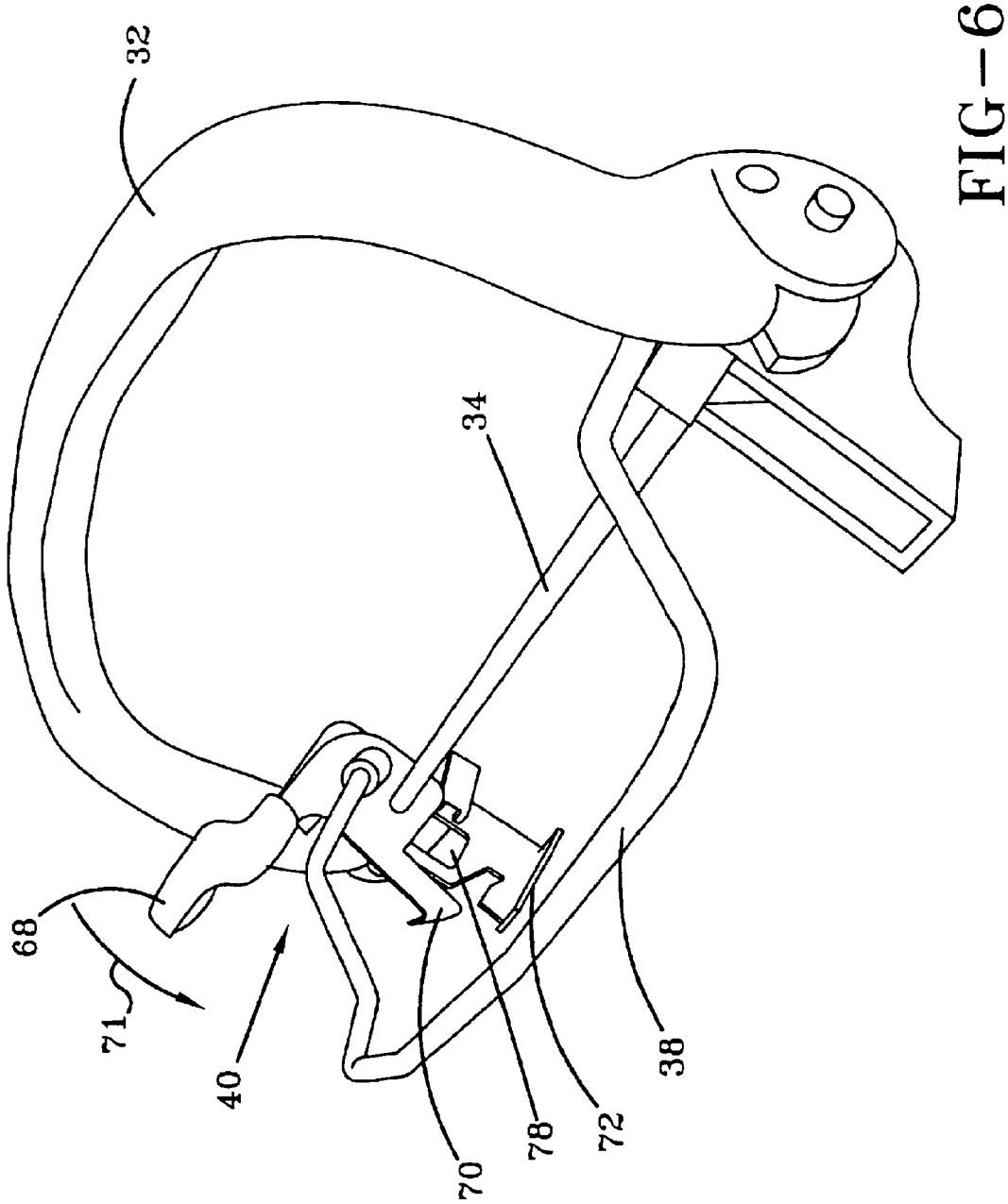
FIG. 6 is perspective view of the present invention shown without the cover.
Figure 10:
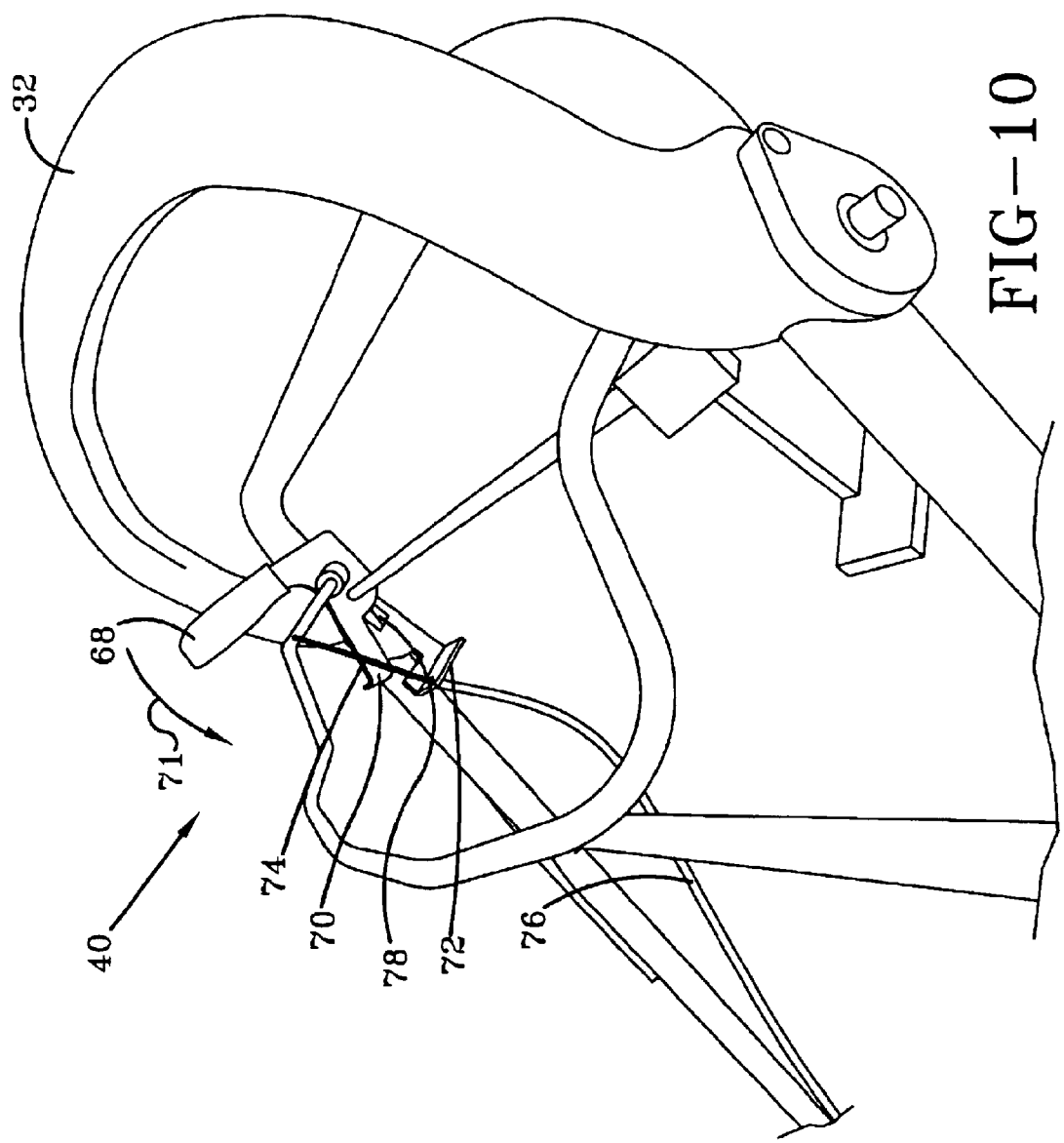
FIG. 10 is view of the present invention showing the self-starter mechanism cable attached to the operator presence control bail.
Figure 11:
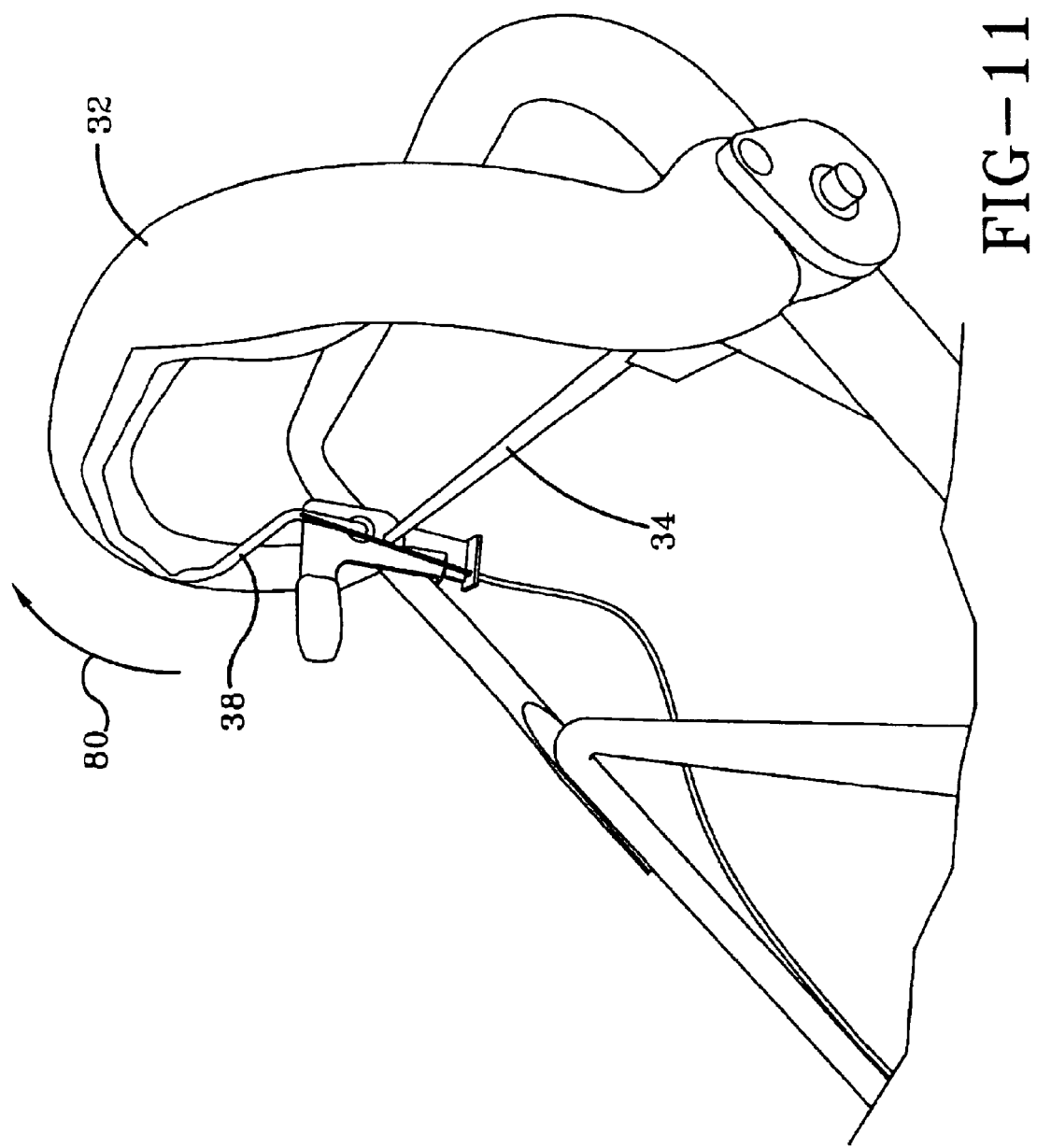
FIG. 11 is a view of the present invention shown at half speed.

The self-start mechanism (40) can be best seen in FIGS. 6 and 10. The self-starting mechanism (40) consists of a cable engaging button (68), a cable lock (70), a cable stop, (72) a cable (74), and a cable surround (76). In one embodiment of the self-starting mechanism (40) the cable (74) is attached to the operator presence bail (38) as illustrated in FIG. 10 and in another embodiment of the self-starting mechanism (40) the cable (74) is attached to the cable stop (72). In order to operate the self-starting mechanism (40), the operator pushes the cable-engaging button (68) in a forward direction as indicated by the arrow (71). This in turn rotates the cable lock (70) in a counterclockwise direction. The cable lock (70) rotates or pivots until the end of the cable lock (70) is received within a slot (78) on a cable stop (72). This prevents the cable stop (72) from sliding in a direction along the pivot rod (34) and holds it in position. When the operator pulls the operator presence control bail (38) in the direction shown by the arrow (80) on FIG. 11, the cable (74) is pulled, but the cable surround (76) is held in place thereby engaging the self-starting mechanism (40) and ultimately starting the engine (12). FIG. 11 shows the engine (12) running using the self-starting mechanism (40).

Figure 4:
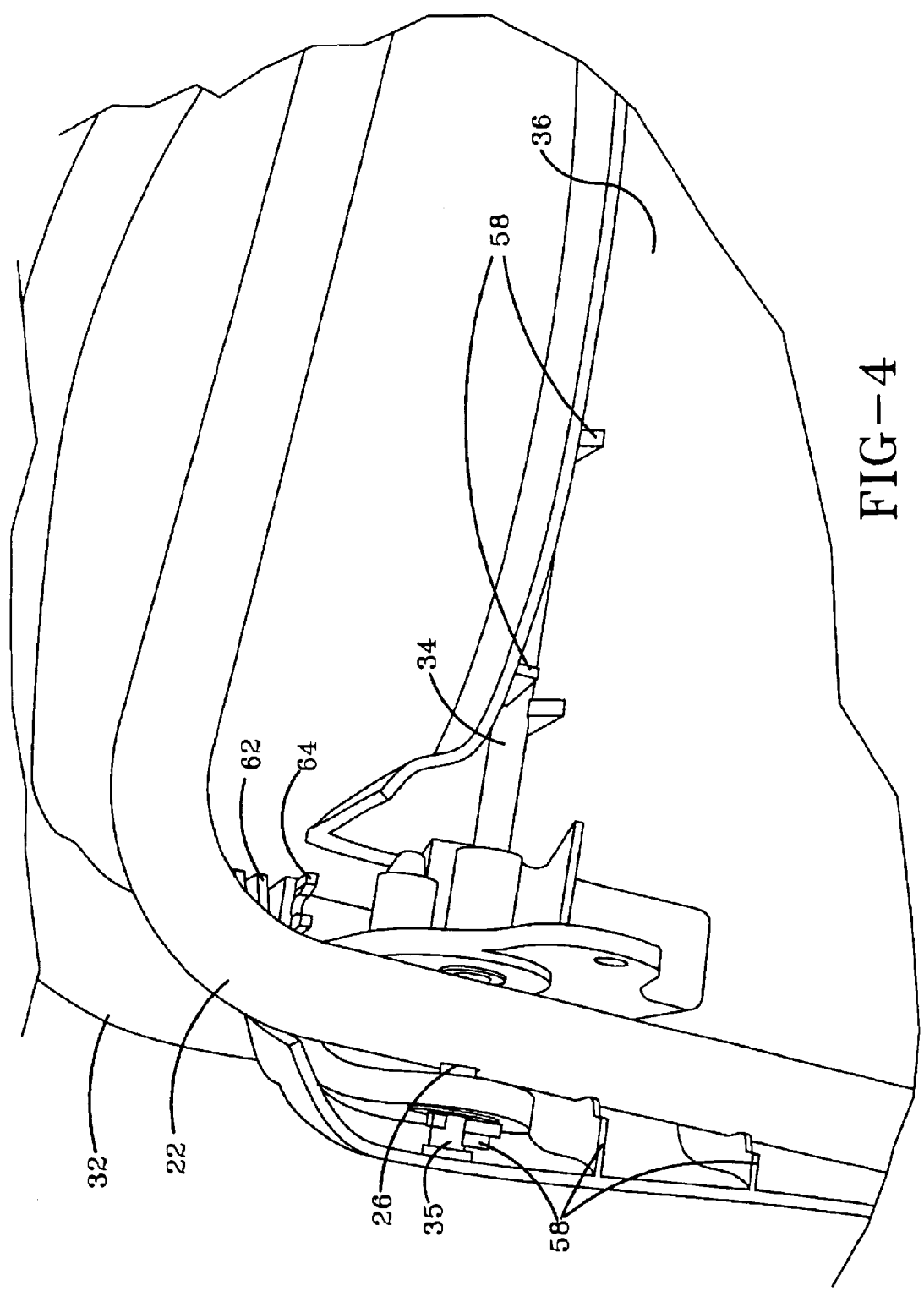
FIG. 4 is a close up view of the cover snap location at the end of the rod.
Figure 5:
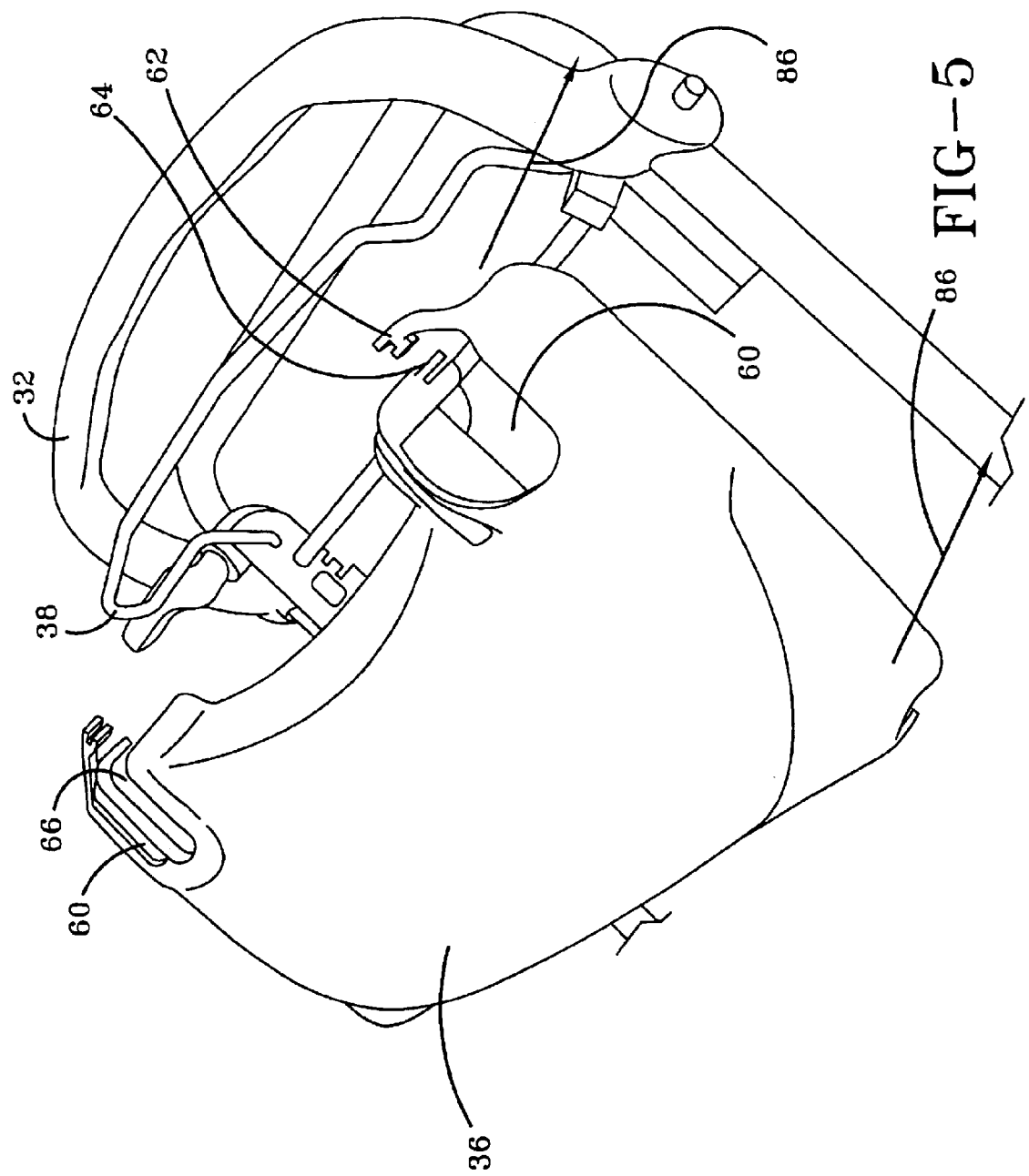
FIG. 5 is perspective view of the present invention showing how the cover attaches to the handle bar and rod.
Figure 8:
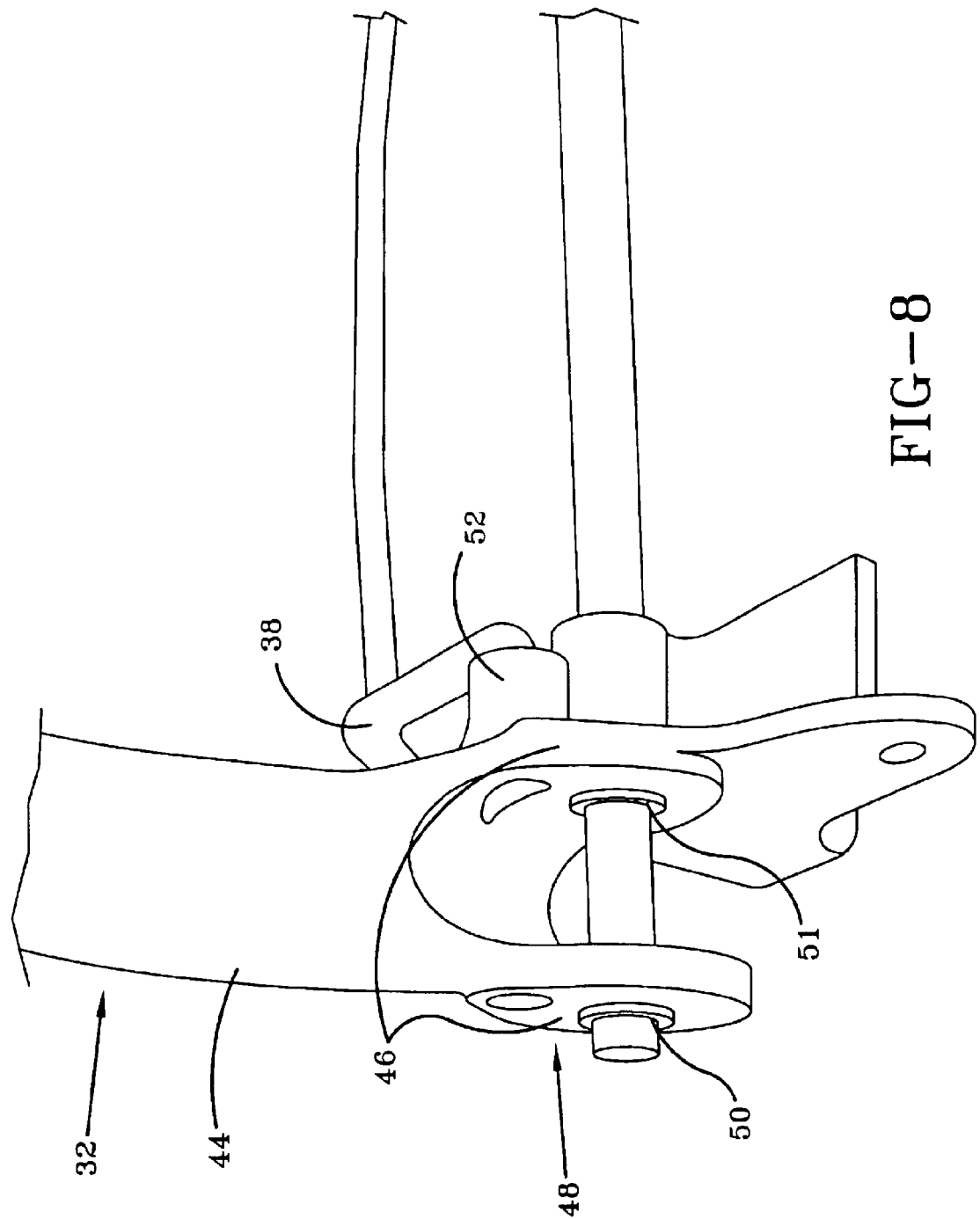
FIG. 8 is a close up view of the connection between the control speed bail and the rod.

With the components of the present invention now herein described the method of assembling the speed control system (30) will now be explained. Referring to FIG. 7, the horseshoe shaped (48) ends of the speed control bail (32) are placed over each support member (24) of the handle bar (22) in a direction illustrated by the arrows (82). The cable engaging button (68), the cable lock (70) and the cable stop (72) are then placed over the apertures (50, 51) on the speed control bail (32) as indicated by the shaded line (53) in FIG. 7. The pivot rod (34) is then inserted through the first or outside aperture (50) on the horseshoe shaped (48) end portion of the speed control bail (32) then through the openings (26) in the support member (24) of the handle bar (22) and through the second or inside aperture (51) on the horseshoe shaped (48) end of the speed control bail (32). The pivot rod (34) is then further extended to the other horseshoe shaped (48) end of the speed control bail (32) where the preceding process is repeated. As illustrated in FIG. 8, the pivot rod (34) extends slightly beyond the horseshoe shaped (48) portion of the speed control bail (32). This allows the cover (36) to be snapped onto the end portion (35) of the pivot rod (34) that extends beyond the horseshoe shape (48) of the speed control bail (32) thereby holding the pivot rod (34) in position and eliminating any back and forth the movement in the pivot rod (34) with respect to the handle bar (22). This snap location (58) is best illustrated in FIG. 4. Next, legs (90) on the operator presence control bail (38) are inserted into the appropriate slots (52) on the speed control bail (32) as illustrated by the arrows (84) in FIG. 7. Even though the operator presence control bail (38) is made of a rigid material there remains enough flexibility in the material to allow the manufacturer the capability to insert either end of the bail into the appropriate slots (52). Finally, referring to FIG. 5, the cover (36) is placed over the handle bar (22) and around the ends of the speed control bail (32) as illustrated by the arrows (86). The cover (36) is then snapped into the various locations on the pivot rod (34) and the handle bar (22) as illustrated by the snap locations (58) in FIG. 3. The tab (62) is then inserted into the tab slot (64) on the backside of the receiving zone (60) of the cover (36) to secure the cover (36) to the speed control bail (32). Again, it should be noted that the components for the self-starting mechanism (40) and the operator presence control bail (38) are not required for the present invention. In its simplest form, the present invention will consist of the speed control bail (32), the pivot rod (34), and the cover (36), which are assembled as described above.

Figure 9:
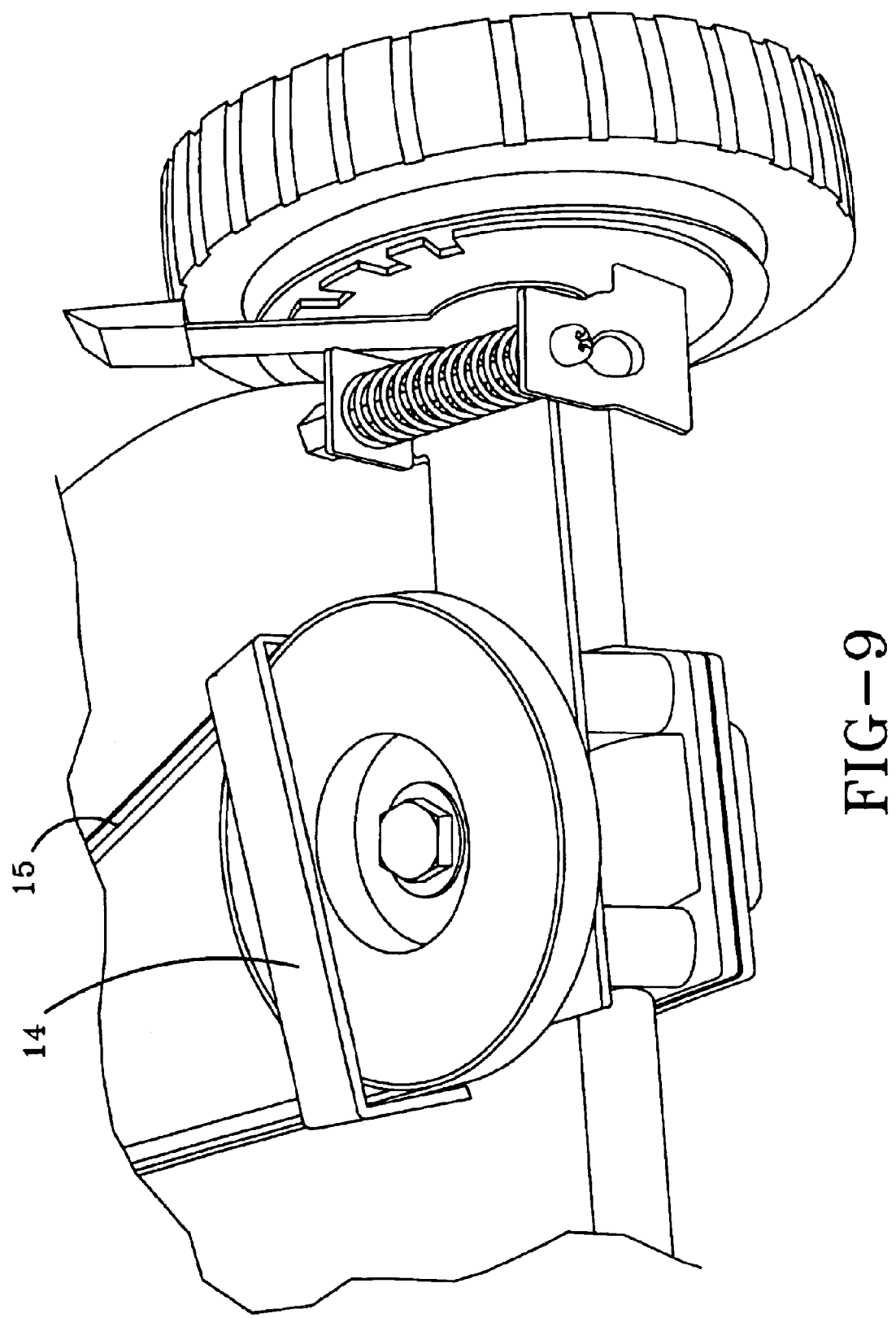
FIG. 9 is a close up view of a transmission used to communicate with the speed control system.
Figure 12:
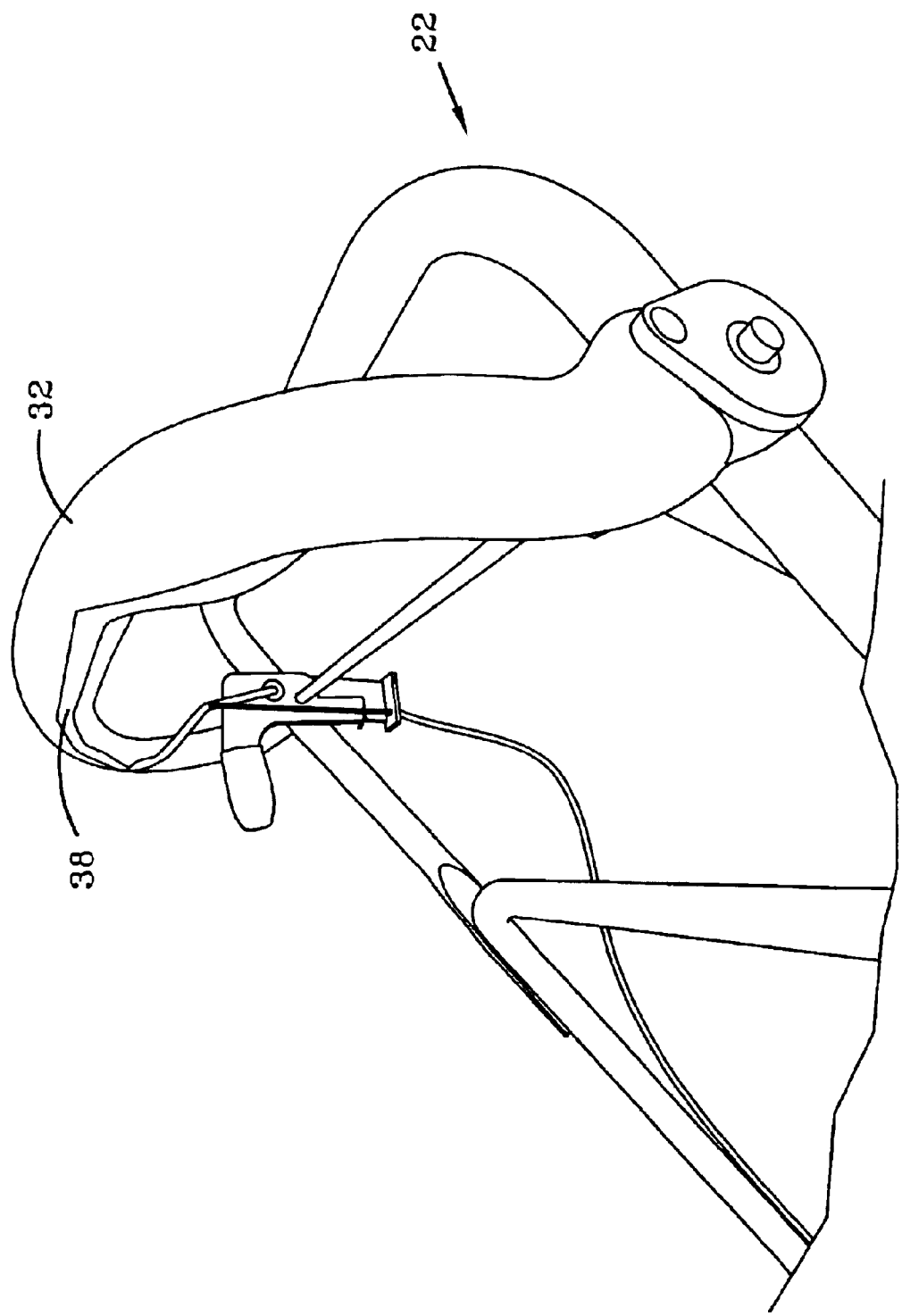
FIG. 12 is a view of the present invention shown at full speed.

Referring to FIGS. 9, 11 and 12 operation of the speed control system (30) will now be described. Once the operator engages the engine (12) the operator simply pushes the speed control bail (32) in the forward direction to engage the transmission (14). The further the operator pushes the speed control bail (32) in the forward direction the tighter the belt driven transmission (14) engages and the faster the vehicle will travel. It should be noted that a belt driven transmission (14) is not required for the operation of the present invention. Any type of transmission (14) could be used chosen with sound engineering judgment. FIG. 11 shows the speed control system (30) at half speed and FIG. 12 shows the speed control system (30) at full speed. In order to decrease the speed of the vehicle operator pulls the speed control bail (32) in the backward direction. The belt driven transmission (14) will begin to release and the vehicle will begin to slow in speed.

The preferred embodiments have been described, hereinabove. It will be apparent to those skilled in the art that the above methods may incorporate changes and modifications without departing from the general scope of this invention. It is intended to include all such modifications and alter-

Having thus described the invention, it is now claimed:

1. Speed control apparatus adapted to be received by an associated handle bar of a self-propelled lawn mower for enabling an operator to selectively control the speed of the lawn mower, the handle bar having first and second support members with first and second openings respectively, the apparatus comprising:

an elongate pivot rod member received between the first and second support members in the first and second openings of the associated handle bar;

a pivoting speed control bail having first and second legs with first and second apertures respectively, the first and second apertures receiving the pivot rod member so as to pivotably mount the speed control bail on the pivot rod such that the speed control bail can pivot with respect to the handle bar to select the desired speed of the lawn mower; and an attachment cover having a snap connection means connecting the attachment cover to the pivot rod member such that the attachment cover prevents the pivot rod member from separating from the handle bar or the speed control bail and thereby securing the speed control bail to the handle bar.

2. The apparatus of claim 1 further comprising:

a pivoting operator control bail having first and second legs;

wherein the first and second legs of the pivoting speed control bail have first and second receiving slots respectively adapted to pivotally receive the first and second less of the pivoting operator control bail.

3. The apparatus of claim 2, wherein the speed control bail and the operator control bail pivot in unison with respect to the handle bar and the operator control bail pivots with respect to the speed control bail.

4. The apparatus of claim 2 wherein first and second legs of the speed control bail form a U-shape, and wherein the end of each leg forms a horseshoe shaped receiving area for receiving the handle bar.

5. The apparatus of claim 4 wherein the U-shaped speed control bail has a slot formed therein in a base portion of the U-shaped bail between said first and second legs, said slot positioned to at least partially receive the operator control bail when the operator control bail is pivoted adjacent the speed control bail.

6. The apparatus of claim 4 wherein the attachment cover contains two receiving zones for receiving the legs of the speed control bail and two slots for receiving legs of the operator control bail so that the speed control bail and operator control bail pivot relative the attachment cover.

7. The apparatus of claim 4 in combination with a lawnmower, said lawnmower comprising an engine, a transmission connected to said engine with a belt and a cable connecting said apparatus to said transmission, wherein when said speed control bail is pivoted in a forward direction, said transmission causes the lawn mower to move at a faster speed, and when said speed control bail is pivoted in a rearward direction, said transmission causes the lawn mower to move at a slower speed.

8. The apparatus of claim 1 further comprising:

means for engaging the pivoting operator control bail to an associated engine starting mechanism.

9. Speed control apparatus adapted to be received by an associated handle bar of a self-propelled lawn mower for enabling an operator to selectively control the speed of the lawn mower, the handle bar having first and second support members with first and second openings respectively, the apparatus comprising:

an elongate pivot rod member received between the first and second support members in the first and second openings of the associated handle bar;

a U-shaped speed control bail having first and second legs with first and second apertures respectively, the first and second apertures receiving ends of the pivot rod member so as to pivotably mount the speed control bail on the pivot rod such that the speed control bail pivots with respect to the handle bar to thereby select a desired speed of the lawn mower;

an operator control bail having first and second legs, wherein the first and second legs of the speed control bail have first and second receiving slots respectively adapted to pivotally receive the first and second legs of the operator control bail to pivotably mount the operator control bail on the speed control bail such that the speed control bail and the operator control bail pivot in unison with respect to the handle bar and the operator control bail pivots with respect to the speed control bail; and a snap-on attachment cover connected to the pivot rod member between the first and second support members of the handlebar such that the attachment cover prevents the pivot rod member from being removed from the first and second openings in the handle bar thereby securing the speed control bail to the handle bar.

10. The apparatus of claim 9 wherein the U-shaped speed control bail has a slot formed therein in a base portion of the U-shaped bail between said first and second legs, said slot positioned to at least partially receive the operator control bail when the operator control bail is pivoted adjacent the speed control bail.

11. The apparatus of claim 9 wherein the attachment cover contains two receiving zones for receiving the legs of the speed control bail and two slots for receiving legs of the operator control bail so that the speed control bail and operator control bail pivots relative the attachment cover.

12. The apparatus of claim 9 wherein the end of each leg of the speed control bail forms a horseshoe shaped receiving area for receiving the handle bar, and wherein the pivot rod passes through said horseshoe shaped receiving areas such that end portions of the pivot rod extend out from the horseshoe shaped receiving areas, and said snap-on attachment cover snaps onto said end portions to impede back and forth movement of the pivot rod member with respect to the handle bar.

13. A self-propelled lawn mower comprising:

an engine;

a transmission connected to said engine with a belt;

a handle bar having first and second support members with first and second openings respectively;

speed control apparatus for enabling an operator to selectively control the speed of the lawn mower, the speed control apparatus comprising:

a cable connecting said apparatus to said transmission, an elongate pivot rod member received between the first and second support members in the first and second openings of the associated handle bar;

a U-shaped speed control bail having first and second legs with first and second apertures respectively, the first and second apertures receiving ends of the pivot rod member so as to pivotably mount the speed control bail on the pivot rod such that the speed control bail pivots with respect to the handle bar to thereby select a desired speed of the lawn mower;

an operator control bail having first and second legs, wherein the first and second legs of the speed control bail have first and second receiving slots respectively adapted to pivotally receive the first and second legs of the operator control bail to pivotably mount the operator control bail on the speed control bail such that the speed control bail and the operator control bail pivot in unison with respect to the handle bar and the operator control bail pivots with respect to the speed control bail; and a snap-on attachment cover connected to the pivot rod member between the first and second support members of the handlebar such that the attachment cover prevents the pivot rod member from being removed from the first and second openings in the handle bar thereby securing the speed control bail to the handle bar;

wherein when said speed control bail is pivoted in a forward direction, said transmission causes the lawn mower to move at a faster speed, and when said speed control bail is pivoted in a rearward direction, said transmission causes the lawn mower to move at a slower speed.

14. The lawn mower of claim 13 wherein the end of each leg of the speed control bail forms a horseshoe shaped receiving area for receiving the handle bar, and wherein the pivot rod passes through said horseshoe shaped receiving areas such that end portions of the pivot rod extend out from the horseshoe shaped receiving areas, and said snap-on attachment cover snaps onto said end portions to impede back and forth movement of the pivot rod member with respect to the handle bar.

* * * * *